United States Patent [19]

Herrington et al.

[11] 4,170,569

[45] Oct. 9, 1979

[54] AMPHORA AGGREGATES AND THE PROCESS FOR THEIR PREPARATION

[75] Inventors: Daniel R. Herrington, Chesterland; Albert P. Schwerko, Solon, both of Ohio

[73] Assignee: Standard Oil Company

[21] Appl. No.: 913,266

[22] Filed: Jun. 7, 1978

Related U.S. Application Data

[62] Division of Ser. No. 866,450, Jan. 3, 1978.

[51] Int. Cl.$^2$ .......................... B01J 35/08; B01J 37/00
[52] U.S. Cl. ............................ 252/448; 252/477 R; 264/13
[58] Field of Search ............. 252/448, 477 R; 264/13, 264/14, 15; 428/402

[56] References Cited

U.S. PATENT DOCUMENTS

| 3,798,176 | 3/1974 | Ao ................................... 252/477 R |
| 3,848,033 | 11/1974 | Callahan et al. ................. 252/456 X |
| 3,966,639 | 6/1976 | Callahan et al. ................. 252/477 R |

*Primary Examiner*—W. J. Shine
*Attorney, Agent, or Firm*—David J. Untener; Herbert D. Knudsen; Larry William Evans

[57] ABSTRACT

Improved amphora aggregates having a substantially spherical shape, a void center and two cavities 180° apart in the external surface communicating to the void center are useful in diffusion-limited reactions and/or reactions in which heat transfer is critical. Especially preferred is use of the amphora aggregates in the hydrotreating of light hydrocarbon fractions, catalytic reforming, and fixed-bed alkylation processes.

20 Claims, 2 Drawing Figures

FIG. A
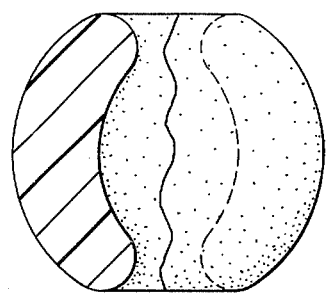

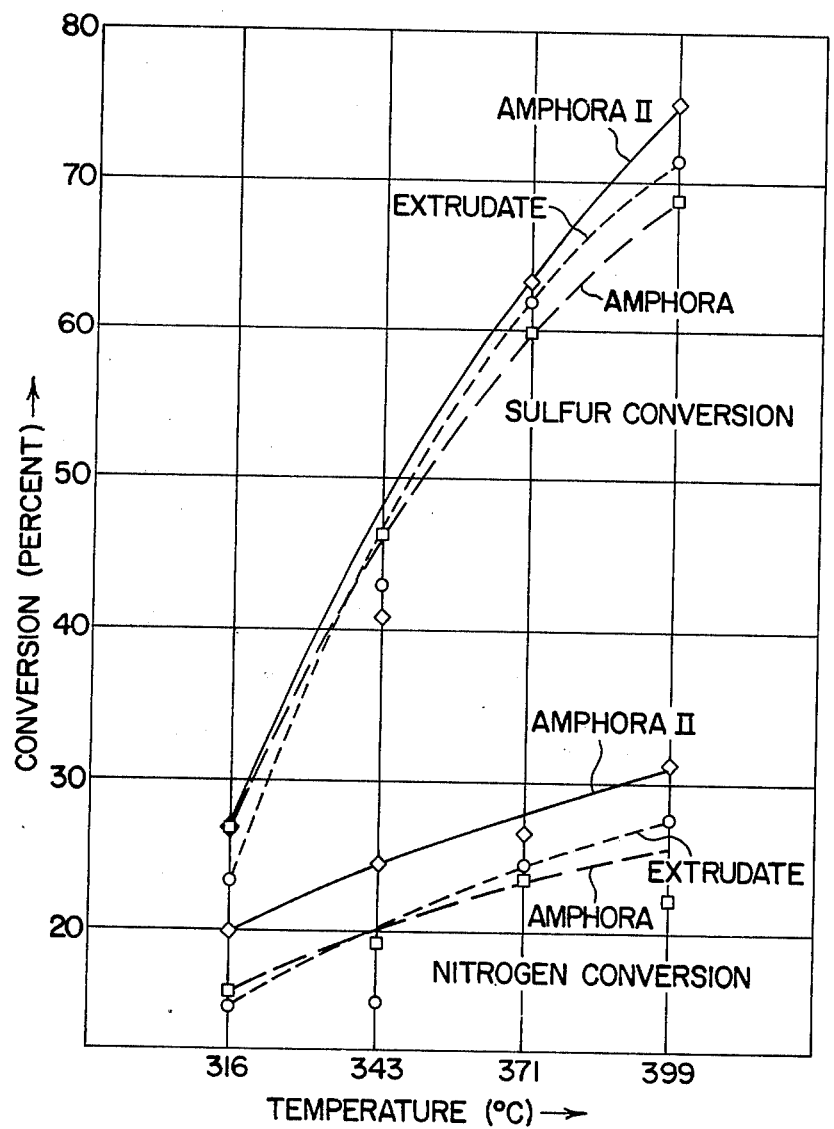
FIG. B

AMPHORA AGGREGATES AND THE PROCESS FOR THEIR PREPARATION

This application is a division of application Ser. No. 866,450, filed Jan. 3, 1978.

BACKGROUND OF THE INVENTION

U.S. Pat. Nos. 3,848,033 and 3,966,639 to Callahan, et al. describe an aggregate having a spherical or semispherical shape, a void center and a single cavity in the external surface communicating to the void center prepared by
 (a) preparing a slurry, the slurry comprising a suspending liquid and distinct particles of a first solid suspended in said liquid;
 (b) preparing a particle bed consisting of particles of a second solid;
 (c) forming droplets of the slurry; and
 (d) dropping the droplets of the slurry into the particle bed in such a manner that the total droplet is not immersed in the powder and under conditions where the suspending liquid is at least partially removed from the slurry droplet to form an aggregate of the distinct particles of the first solid.

Using the process disclosed in the above patents, rounded aggregates are formed which are highly attrition resistant. In certain applications, the invention described therein is capable of producing a rounded aggregate having a void center. Those aggregates having a void center and a single cavity in the external surface communicating to the void center have been named "amphora." These amphora are especially desirable for catalysts because the exposed outer surface of the aggregates is substantially increased as compared to the surface of a pellet prepared by normal compaction techniques. The catalyst particles of the present invention, hereinafter referred to as "amphora II," are especially advantageous for processes in which the feed is only partially vaporized, i.e., trickle-bed processes. The particles have substantially the same amphora shape described in U.S. Pat. No. 3,966,639 and 3,848,033 but the novel aspect of the present invention is incorporation of a second cavity 180° to the first cavity, both communicating to a common void center. When amphora particles, such as those described in the above patents are employed in a trickle-bed process, the amphora which are orientated with their opening toward the top of the reactor become filled with a pool of liquid. This liquid will have a longer hold-up time than the liquid passing over the outer portion of the catalyst. If the linear velocity of the feed is sufficiently high, there should be a reasonable rate of exchange of this liquid with fresh feed, and therefore the interior of the amphora particle will still remain effective. At low linear velocities, however, the turnover rate of this liquid pool will be slow and the interior of the amphora will be filled with a stagnant or semi-stagnant liquid which will decrease effectiveness of the catalyst. The improved amphora aggregates of the present invention eliminate several problems encountered using prior art catalysts. The incorporation of the second opening in the amphora 180° from the first cavity provides a means by which a liquid can pass unhindered through the void center of the amphora.

U.S. Pat. No. 3,957,627 discloses hydrotreating a hydrocarbon feed stock containing compounds with carbon-sulfur bonds, carbon-nitrogen bonds and carbon-oxygen bonds by contacting the hydrocarbon feed stock with hydrogen and a hydrotreating catalyst to remove sulfur, nitrogen and oxygen from the hydrocarbon feed stock using an amphora catalyst. West German Provisional Pat. No. 2,540,637 and Belgium Pat. No. 833,639 disclose use of amphora shaped catalysts in naphtha reforming.

U.S. Pat. No. 3,340,180 discloses a process for hydrogen treatment of heavy petroleum hydrocarbons in the presence of a catalyst comprising essentially a minor amount of a hydrogenation catalyst composited with a major amount of an activated alumina having less than 5% of its pore volume that is in the form of pores having a radius of 0–300 A. and pores larger than 100 A. radius and having less than 10% of said pore volume in pores larger than 80 A. radius. The activated alumina is prepared by treating a substance which is predominantly composed of a crystalline alumina hydrate containing from 1.2–2.6 moles of water of hydration and which is substantially free of alumina monohydrate and alumina trihydrate; the alumina hydrate being prepared by precipitation from a solution of an aluminum compound at a pH between 7 and 12, a drying to the above-mentioned water of hydration content prior to substantial transformation to an alumina hydrate having a higher or lower water of hydration content. The dried alumina hydrate is then hydrothermally treated by heating it in the presence of water in an autoclave at a temperature sufficient to vaporize the water and under the pressure generated in the autoclave at the temperature. This is followed by drying and calcining the hydrothermally treated alumina hydrate to provide the activated alumina. U.S. Pat. No. 3,764,565 discloses that a resid hydrocarbon is converted to lower boiling hydrocarbons and/or desulfurized by contacting, in the presence of hydrogen, said resid with a bed of catalyst particles comprising a catalytically active composition comprising a hydrogenation metallic component of Group VIB and/or VIII of the Periodic Table supported on an inorganic cracking matrix, wherein the catalyst particle is characterized by having a predetermined size and configuration such that the particle has a surface-to-volume ratio ranging between about 100 and about 250 (1/inches), and wherein substantially all points within the particle are less than about 0.015 inch from the particle surface.

The hydrotreating of hydrocarbon feed stocks containing carbon-sulfur bonds, carbon-nitrogen bonds and/or carbon-oxygen bonds, is well known in the art. See for example G. C. A. Schuit and B. C. Gates, *A.I.Ch.E.J.* 19 (3), 419 (1973); S. C. Schuman and H. Shalit, *Catal. Rev.* 4 (2), 245 (1970). As can be seen from the art, these reactions normally involve the use of catalysts consisting of support material impregnated with various catalytically active ingredients. Alternatively, the active ingredients and support are prepared together.

Molten solutions have been frozen by dropping a melt into a bed of small particles, see for example U.S. Pat. Nos. 3,070,837; 3,255,036; and 2,938,233. Such solidification has been carried out with the purpose of coating the pellet formed with the particles in the bed or the incorporation of large quantities of particles of the bed into the final pellet. All these techniques of the art require that the material solidified be molten.

The present invention is the result of a search for more efficient and desirable catalysts useful in the conversion of hydrocarbons.

SUMMARY OF THE INVENTION

It has now been discovered in accordance with the present invention aggregates having a substantially spherical shape, a void center therein, a first cavity in the external surface communicating to the void center, a second cavity 180° from said first cavity communicating to said void center prepared by:
  (a) preparing a slurry, the slurry comprising a suspending liquid and distinct particles of a first solid suspended in said liquid;
  (b) preparing a particle bed consisting of particles of a second solid;
  (c) forming droplets of the slurry;
  (d) dropping the droplets of the slurry into the particle bed under conditions where the suspending liquid is not immersed in the particle bed;
  (e) removing at least part of the suspending liquid from the slurry droplets under conditions so as to impart a differential rate of drying between the external surface of the slurry droplets and the interior of the droplets, wherein prior to removing at least part of the suspending liquid from the slurry droplets, the slurry droplets are subjected to means sufficient to (1) enhance the rate of drying on the external surface of the slurry droplets and to (2) retard the rate of drying in the interior of the slurry droplets, whereby aggregates having a void center and two cavities 180° apart in the external surface of said aggregates communicating to the void center are produced upon removal of at least part of the suspending liquid from the slurry droplets.

The significant aspect of the present invention is the novel shape of the catalyst. While the function of the aggregates described in the present invention, "amphora II" particles, is similar to that of the ring-shaped or tube-shaped particle, the geometries of the latter shaped particles have inherent disadvantages in trickle-bed reactions. When packed in a fixed-bed reactor, ring-shaped or tube-shaped catalysts log or stack. During trickle-bed operation, these orientations will lead to severe channeling, which results in a lower off-reactor efficiency. By sharp contrast, amphora II are spherical particles which pack uniformly and openings will have a statistical distribution of orientations, thus minimizing channeling.

While the amphora II particles retain all the advantages of the amphora particles described in U.S. Pat. Nos. 3,848,033, 3,966,639, and 3,957,627 for diffusion-controlled reactions, the particles offer a short catalytic diffusion path length but yet a large overall particle diameter, and the amphora shape results in a high surface-to-volume ratio. By the preferred procedure of the invention, amphora II exhibit a high level of performance in trickle-bed processes with low linear throughput, however amphora II may also be successfully employed in units with mass velocities high enough to allow exchange in the liquid pool which may form in amphora. It is to be understood that the term "mass transfer" is defined as a combination of
  (a) diffusion predominantly normal to liquid flow and
  (b) convection predominantly in the direction of the liquid flow.
When the amphora particles described in U.S. Pat. No. 3,848,033 are employed in a trickle-bed reactor, both (a) and (b) apply to the outer surface but (a) predomonates in the interior of each particle. However, the geometry of the amphora II of the present invention opens up the interior of the particles to convective mass transfer and the reactor approaches plug flow behavior. Improved hydrogen utilization and/or higher conversions of desired product is appreciated in the hydrotreating or hydrocracking processes using the amphora II particles since more external surface of said particles is exposed to the moving film. The moving liquid decreases the rate of coke build-up in the interior of the amphora and therefore the effective lifetime of the catalyst is enhanced.

Amphora II particles may be used effectively and advantageously in any processes in which the feed is present in the reactor partially in the liquid phase. Especially preferred is use of amphora II in the petrochemical industry for hydrotreating and/or hydrocracking of heavy oil fractions or for the hydrotreating and refining of lubricating oil and waxes. Superior results are achieved in a process of hydrotreating a hydrocarbon feed stock containing compounds with carbon-sulfur bonds, carbon-nitrogen bonds and carbon-oxygen bonds by contacting the hydrocarbon feed stock with hydrogen at an elevated temperature and with a hydrotreating catalyst to remove sulfur, nitrogen and oxygen from the hydrocarbon feed stock. Amphora II may also be successfully employed to some extent in the pharmaceutical and chemical industries. While an amphora II catalyst having a novel particle shape is especially useful in gas-liquid phase processes, the same may also be successfully utilized in gas phase reactions. The second cavity in the amphora II particle results in a catalyst bed which has a low resistance to gas flow. In general, amphora II may be successfully incorporated in the same catalytic reactions as "amphora" described in U.S. Pat. No. 3,848,033, i.e., all diffusion-limited reactions and/or reactions in which heat transfer is critical. Examples of such reactions are hydrotreating of light hydrocarbon fractions, catalytic reforming, and fixed-bed alkylation processes, although the usefulness of the amphora II particles is not contemplated to be limited to said processes.

The process for preparing amphora II may be accomplished using the same technique for preparing "amphora." Both "amphora" and amphora II are prepared from a slurry, which consists of one or more solid particles suspended in an aqueous or other liquid medium, dispensed in the form of droplets onto a bed of finely divided solids and dried in such a manner as to impart a differential rate of drying across the particles. Said differential rate of drying may be effectively accomplished by:
  (a) dispensing droplets of an aqueous slurry onto a hydrophilic bed and heating either from above or below said aqueous slurry in the presence of an undirectional stream of air, or
  (b) dispensing droplets of an aqueous slurry onto a hydrophobic bed and heating from above said aqueous slurry.

Slurry

The important aspect of the present invention is the use of a slurry to prepare aggregates. This slurry may vary widely in composition. The slurry consists of at least two components: (1) a suspending liquid; and (2) distinct particles of a suspended solid.

The suspending liquid may be essentially any liquid which will suspend the solid. These liquids, of course, vary widely in nature. Some of the liquids are capable of dissolving large quantities of the solid; whereas, others dissolve little or no solid. Although some liquids are more compatible with the techniques of the present invention, any suspending liquid can be used so long as it can be at least partially removed from the slurry droplet in the process of the invention.

The suspending liquid is removed from the slurry droplet by two basic mechanisms. The first mechanism is that of evaporation of the suspending liquid. This liquid removal mechanism, of course, is directly related to the vapor pressure of the suspending liquid under the conditions of the contact of the slurry droplet with the particle bed.

The second mechanism of removing the suspending liquid from the slurry droplet is that of the capillary action of the particle bed into which the droplet is dropped. Of course, the viability of the capillary action is dependent upon a large number of factors, such as the relationship between the suspending liquid and the particle bed, the porosity of the particle bed and the temperature of the slurry drop. These factors will be considered in greater detail in the discussion of the particle bed and the process of the invention.

In this discussion of the suspending liquid, the most important attribute of the suspending liquid is its vapor pressure when the primary liquid removal mechanism is evaporation. If evaporation is the main mechanism of liquid removal, the suspending liquid is normally one which has a relatively high vapor pressure. On the other hand, if capillary action is the primary mechanism, the vapor pressure of the suspending liquid is relatively unimportant.

Liquids suitable for use as the suspending liquid in the present invention include: water; alcohols, such as methanol, ethanol, butanol and hexanol; polyalcohols; ethers, such as methyl ether, ethyl ether and the like; ketones, such as acetone, methyl ethyl ketone, methyl i-butyl ketone and the like; hydrocarbons, such as hexane, cyclohexane, kerosine and the like; chlorinated hydrocarbons, such as methylene chloride, 1,1,1-trichloroethane, perchloroethylene and the like; aromatic compounds, such as benzene, toluene, chlorobenzene and the like; and any other liquid that is capable of suspending the solid in the slurry. The suspending liquid may be any of these materials individually or any combination or emulsion of liquids.

Normally, less preferred are the liquids having a very low or a very high vapor pressure. These liquids, however, can be employed so long as the liquid can be removed by the interaction of the slurry with the particle bed.

Preferred in the present invention is the use of water or a mixture of water and alcohols having a boiling point higher than water as the suspending liquid. This liquid is inexpensive and conveniently removed from the slurry droplet by a number of techniques.

The second component of the slurry is the solid which is suspended in the suspending liquid. For purposes of clarity, this solid is referred to as the first solid. This is the solid that is formed by the process of the present invention into at least part of the aggregate. Accordingly, the description must be rather broad, for it incorporates any material that is agglomerated into an aggregate by the process of the invention.

The first solid may vary widely in composition. It may be a single material, or it may be a combination of two or more solids. The solid material may have many functions in the final aggregate. For example, the solid material may be the active ingredient of the final product, it could be the binder; it could be a porosity improver; it could be an extender; it could be a surfactant; or it could serve any other function.

Any of these solids may be soluble to almost any extent in the suspending liquid, but the total combination of solids and liquid must be a slurry. Preferred slurries contain at least about 5 percent by weight of insoluble solids based on the weight of the suspending liquid under the conditions of droplet formation, with slurries containing at least about 10 percent by weight of insoluble solids being especially preferred. In any particular application, however, the preferred weight of insoluble solids is highly dependent upon the solid agglomerated and the suspending liquid employed in the invention.

The insoluble solids content of a given slurry may be easily determined by forming the slurry with a measured amount of suspending liquid, bringing the slurry to the conditions of droplet formation, allowing the slurry to stand so that the undissolved solids separate from the liquid and decanting and drying the solids in the slurry. Alternatively, the slurry can be centrifuged, a measured amount of a flocculant could be added or the slurry could be filtered to determine the insoluble solids content. The total solids content of the slurry, of course, is the sum of the soluble and insoluble solids of the slurry.

As noted, there is essentially no limit on the type of materials that may be formed into aggregates by the process of the invention. The only criterion that must be met is that there is a liquid in which the solid can be slurried under the conditions of droplet formation.

Broad representative examples of the solids that may be employed in the present invention include: catalyst materials and catalyst precursors; clay; agricultural chemicals, such as urea, ammonium nitrate, herbicides and insecticides; polymers, such as polyethylene, polypropylene, polystyrene, polymethylmethacrylate, and high-nitrile resins; and other materials such as acids, bases, polyurethane intermediates, detergents, metals, metal oxides, metal organic compounds, metal salts, solid organic compounds, pharmaceutical chemicals, food products, carbohydrates and the like. Any of these solids could be used in the process of the invention.

The slurry of the invention may contain other components which are specifically designed to enhance the desirability of the aggregate formed. These components may be dissolved or suspended in the suspending liquid to serve various functions. For example, materials may be suitably included in the slurry as binders, porosity improvers, extenders and the like.

Many of the suspended solids in the slurry can be processed by the present invention to prepare a desirable hard, rounded aggregate. Others, while forming an aggregate, may not posses the desired attrition resistance. Binders can be incorporated into the slurry to rectify this problem. Suitable binders include hydrous oxide gels, such as silica gels and alumina gel, and adhesives such as natural and synthetic resins including rosin, pitch, polyvinyl acetate, phenol-formaldehyde resins and the like. Essentially, any material that increases the cohesiveness of the resulting aggregate may be used.

Porosity improvers can also be added to the slurry. Such porosity improvers are normlly materials that are initially incorporated into the structure of the aggregate and then after the aggregate is formed, these improvers are removed by some appropriate technique. For example, a very high boiling liquid which is not removed in the process of the invention may be incorporated into the slurry. When the aggregate is formed, this liquid is entrapped in the solid. The liquid is then removed by calcining the aggregate at a high temperature. The escape of the vapors of the high boiling liquid creates a particle having greater porosity. As a second example, a combustible or decomposable substance can be incorporated into the slurry. Again these particles are entrapped in the aggregate. Their removal by combustion or decomposition gives an aggregate of greater porosity.

A third desired modification of the slurry is the use of extenders. This is the incorporation of materials into the slurry which do not significantly affect the activity of the product in its intended use. For example, when aggregates of an active herbicide are made by the process of the present invention, inert ingredients could be added to protect the desired plants from damage that would result if only the pure herbicide formed the aggregate. Thus, the activity of the herbicide is diluted to an appropriate concentration.

Of course, these are only some of the examples of components of the slurry which are added for a designed purpose. Other ingredients could be added to accomplish other results. For example, a combination of two noninterfering catalytic ingredients could be produced in a single aggregate. These aggregates could be placed in a catalytic reactor, and the reactor could be alternately or concurrently used for two different reactions without changing the catalyst charge.

A preferred application of the invention is its use to prepare catalyst aggregates from active catalyst components or catalyst precursors. The present invention can be used to prepare a strong, attrition-resistant aggregate which is very suitable for fixed-bed catalytic reactions. These aggregates are conveniently made without the complex extrusion or tableting equipment normally required in pelleting operations.

One important application of the invention is the use of the process to prepare catalysts used in oxidation, ammoxidation or oxidative dehydrogenation reactions. Of special significance among these catalysts are those which contain at least the compounds of nickel and compounds of molybdenum. Thus, in one embodiment of the process of the present invention, the first solid is preferably one which contains at least nickel and molybdenum. Also preferred because of the desirable catalysts repared are the catalysts which contain at least cobalt or bismuth and molybdenum. Thus, in this embodiment, the first solid is preferably one which contains at least the compounds of these metals.

Even though the nature of the solid suspended is not critical, the size of the suspended solid in the slurry is important. The suspended solid must be of such a size that droplets of the appropriate size may be formed. Of course, this means that the size of the particle permissible in the slurry is a direct function of the size of the droplet to be formed. If the size of the droplet is small, the particles of solid in the slurry must be small enough to accommodate the droplet. With larger droplets, larger particles of the suspended solid can be tolerated.

In the present invention, the best results are normally obtained by using a suspended solid in the slurry with a particle size of less than about a millimeter, with those leaving a particle size of less than about 0.2 millimeter being of special interest because of the desirable aggregate formed. The significant advantage of smaller particles is that the resulting aggregate tends to be more cohesive.

In the slurry, the suspended particles are discrete entities. They are spatially separated throughout the slurry by the suspending liquid. In the process of the invention, these separate and distinct particles are agglomerated into an aggregate without the use of compaction techniques associated with tableting operations.

The concentration and density of this slurry may vary widely. It may be extremely concentrated having a high solids concentration, or it may be rather dilute. In either instance, the present invention can be applied to produce aggregates from the slurry. In the preferred practice of the present invention, the slurry of the invention has a low solids content.

One of the most important variables with respect to the shape of the aggregate obtained is the apparent viscosity of the slurry. As a broad rule, it has been discovered in our experiments that as the apparent viscosity of the slurry is increased, the spherical nature of the aggregate formed is increased. In the practice of the invention, it has been found that the preferred range of apparent viscosities is about 400 to about 15,000 centipoise. Of course, this preferred range of viscosities may vary as different solids and suspending liquids are employed.

In the practice of the invention if water is used as a suspending agent, the slurry normally has a specific gravity of about 1.1 to about 3. For slurries using other suspending liquids, these figures can be extrapolated to give figures which should be the characteristic specific gravity for other slurries.

Particle Bed

In addition to the slurry, the present invention utilizes a particle bed. This particle bed is composed of particles of a second solid which may be chemically the same or different from the first solid. The particle bed may vary widely in terms of composition and particle size.

The particle bed may be composed of particles of any chemical composition. Normally, the particles of the particle bed are not substantially incorporated into or permanently deposited on the aggregates formed. Thus, inexpensive, inert materials, such as sand, clay, alumina, carbon, sugar, diatomaceous earth and the like, can be employed as the compositions for the particle bed. In a preferred practice of the invention, however, the solid of the slurry is similar in chemical composition to the solid of the particle bed. In the description of the invention, this means that the first solid and the second solid are chemically similar.

Although the particle bed may be composed of particles of any chemical composition, the nature of the particles plays a significant role in the removal of the suspending liquid. The nature of the particles is central when the suspending liquid is removed from the slurry by means of capillary action as described above.

In this capillary action, the droplet dropped into the particle bed interacts with the particle bed in such a manner that the suspending liquid is drawn out of the droplet. It has been noted that this capillary action is improved when particles having an increased porosity are employed. Accordingly, as the porosity of the solid in the particle bed is increased, the capillary action as a general rule increases. If liquid removal by means of capillary action is contemplated, care should be taken to assure that the particle bed contains a solid of the desired porosity.

A second important aspect of the nature of the second solid which is used to make the particle bed is its relationship with the slurry. The slurry may be repulsed by or attracted to the particle bed. For example, an aqueous slurry dropped into a hydrophobic particle bed would be repulsed by the bed and would produce a significantly different shaped aggregate than would be produced by a neutral or a hydrophilic particle bed. Thus, the interaction between the particle bed and the slurry droplets can be varied to vary the shape of the aggregate formed.

The basic feature of the particle bed is its ability to accept and at least partially encompass the droplets of the slurry without completely destroying the shape of the droplet. To illustrate this phenomenon, consider the dropping of a droplet of slurry on a flat, solid surface. The droplet shape is completely distorted upon impact with the solid surface. The particle bed in the invention must be of such a nature that these droplets are not distorted in this manner. This protection of the droplets is accomplished in essentially two ways: (1) reducing the size of the particle in the bed and (2) controlling the density of the bed.

Of course, it is readily apparent that the size of the particles in the bed has a significant impact on the shape of the droplet. Broadly, the size permissible is dependent upon a number of factors of the preparation, such as the composition of the slurry, the apparent viscosity of the slurry, the nature of the particles in the particle bed, the temperature of the bed and the desired shape of the final aggregate. The parameters on these factors can be altered until the appropriate aggregate is obtained. Generally, as smaller particles are used in the particle bed, the aggregates formed have more of a spherical shape. Also, as the density or apparent viscosity of the slurry is increased, the effect of the size of the particle on the final aggregate is reduced.

In the preferred practice of the present invention, it has been observed that the size of the particles in the particle bed is preferably maintained below about 500 microns with sizes between about 1 and about 200 microns being preferred.

The density of the particle bed at the time of the impact of the slurry droplet also has a significant effect on the shape of the aggregate formed in the process of the present invention. A lower density particle bed creates less impact of the droplets on the bed, and thus, the distortion of the droplet shape is reduced. The lower density is readily obtained by using a low density solid or by fluffing or fluidizing a higher density solid. Fluidizing a solid has an additional benefit in that the heat transfer characteristics of the particle bed are improved. Thus, the removal of the suspending liquid from the slurry is normally enhanced by using a fluidized particle bed even though other changes occur.

Process of Invention

In the practice of the invention, the slurry described is formed into droplets, and the slurry droplets are dropped into the particle bed described. This is accomplished by techniques that are generally known. The particular way in which these procedures are carried out is not the point of the broad concept of the present invention. The preparation of amphora II, however, utilizes special techniques of the present invention.

The droplets of slurry can be formed by a number of known techniques. Devices as simple as a medicine dropper are conveniently used to prepare suitable aggregates. Of course, in a commercial operation, a device forming a plurality of droplets at one time would normally be necessary.

The size of the aggregates formed is directly proportional to the size of the droplet. As the size of the slurry droplet is increased, the size of the aggregate is increased. Using essentially uniform droplets under a given set of operating conditions, yields of substantially uniform aggregate are obtained.

The slurry droplets are usually introduced to the particle bed by means of a gravity drop to an essentially perpendicular particle bed. The droplets, however, may be introduced to the particle bed by other techniques, such as propelling the slurry droplets or dropping the droplets in a strong countercurrent flow of gas. These and other methods of dropping the slurry can be used to increase or decrease the impact of the slurry droplet on the particle bed. For example, the particle bed could have a reciprocating motion with respect to the source of the slurry droplets. When the slurry droplet impacts on the particle bed as the particle bed is moving away from the droplet source, the force of the impact of the droplet on the bed is reduced. On the other hand, if the particle bed is moving toward the droplet source, the force of the impact is increased.

In the present invention, the path of the droplets need not be perpendicular to the bed. The droplets can be dropped on the particle bed at any angle or even propelled across the surface of the particle bed. Any of these techniques could be employed and are encompassed by the term "dropping" as used herein.

Of course, in the practice of the process of the invention, the nature of the slurry and the nature of the particle bed play a preeminent role in the shape of the aggregate formed. Yet, other factors, such as drop height, movement of the bed after droplet impact and temperature, also play important roles.

The drop height may vary widely and is dependent largely upon the shape of aggregate desired. With a short drop height, a thick slurry and a low-density, finely-divided particle bed, an almost perfectly spherical aggregate can be obtained. Generally, as the drop height is increased, the distortion from a spherical shape is more pronounced. The drop height may vary from as small as a fraction of an inch to a height of several feet or more.

Movement of the particle bed may be desirable. One basic goal in imparting movement to the particle bed is to continuously expose fresh solid of the particle bed to the slurry droplets. This tends to maximize the suspending liquid removal and to reduce the possibility of forming "Siamese twin" aggregates. This movement may be of essentially two types: (1) movement with respect to the path of slurry drop which entails little or no mixing of the particles; and (2) mixing of the particles.

The movement of the particle bed without mixing of the particles in the bed is conveniently accomplished by placing the solid of the particle bed on a conveyor belt and moving the belt in an essentially perpendicular plane to the path of the slurry droplet. This moves fresh solid of the particle bed continuously into the droplet target area while little or no mixing of the solid in the particle bed is experienced. An alternative to moving the bed is moving the source of the droplets in such a manner that the droplets fall on fresh solid of the particle bed. Either of these techniques can be beneficially applied to the preparation of amphora.

The second method of imparting movement to the particle bed is a mixing of the solid within the bed. This movement is conveniently accomplished by agitation, fluffing, fluidization, stirring, mixing, blending or continuous removal and makeup of particles in the dropping zone. Such movement is normally conducted during and after droplets are dropped into the particle bed. This movement does not have a desirable effect on the preparation of amphora.

In the process of the invention, the discrete particles of solid in the droplets of slurry are agglomerated to form an aggregate. These aggregates as they are formed may, in some cases, have a thin coating of the solid which forms the particle bed. This coating in most cases is easily removed by agitation, such as mild vibration of the aggregates on a screen. In cases where a more adherent coating is formed, other techniques of solid removal can be conveniently applied.

The nature of the aggregates formed in the present invention vary substantially as the components of the slurry are altered. It is possible, however, to produce very coherent, attrition-resistant aggregates by the process of the invention. These aggregates are especially useful in fixed-bed catalytic reactors because of their spherical shape and stability.

Aggregates having a void center are especially desirable for catalysts because the exposed surface is substantially increased as compared to normal tablets, the problems of diffusion of reactants and products through the catalysts are significantly reduced. By the preferred procedure of this invention, amphora II is formed by retarding the rate of drying in the interior of the slurry droplets prior to removing at least part of the suspending liquid from the slurry droplets. A number of methods may be employed to accomplish a retardation in the drying rate, such as (1) freezing the slurry droplets prior to application of heat,
(2) utilizing a slurry with a relatively low solids content, preferably from 5 to 50 percent by weight,
(3) utilizing a gelatinous slurry, and
(4) using as a suspending liquid a mixture of water and liquid of similar polarity having a higher boiling point than water, such as an alcohol or a polyalcohol.

Essentially any means which enhances the difference in drying rates between the interior and exterior of the amphora II particle which is sufficient to cause formation of the two cavities in the external surface of the amphora II particle is within the scope of the present invention. The amphora II made by this process may have any size, but amphora II having a diameter of 1.5 to about 4.0 millimeters are normally used.

The slurry, particle bed and drop conditions are chosen to give the desired rate of rigidification. One important variable in the conditions is the temperature. Although the slurry drop can be conducted at any temperature, the rate of rigidification is generally increased as the temperature is increased. By the process of the present invention, it is to be understood that the rate of rigidification on the external surface of the amphora II particle shall exceed the rate of rigidification on the interior of said amphora II particle. As discussed in relation to the suspending liquid and particle bed, the rate of rigidification would also increase with the increasing vapor pressure of the suspending liquid and the increasing porosity of the solids and the particle bed.

When the droplet contacts the particle bed, it is, of course, spherical. Broadly, the nature of the particle bed or the conditions of the particle bed, including heat or other source of drying are adjusted so that most, but not all, of the external surface becomes set, i.e. the suspending liquid of the slurry is removed. The suspended particles in the slurry then migrate to the set outer surface, and a void center is formed. In a similar manner, the portion of the external surface of the spherical droplet that was not originally dried migrates to the interior of the droplet. By the process of the present invention, this migration "pulls" two holes located 180° apart in the external surface of the droplet communicating to the void center.

It is not clearly understood how the amphora II particle is formed since it is a natural phenomena which is not restricted to any specific composition. Slurries of various compositions are described in U.S. Pat. No. 3,966,639 and may be successfully employed to form amphora II catalysts. Superior results are achieved if amphora II catalysts contain at least one of vanadium, chromium, manganese, iron, cobalt, nickel, copper, zinc, molybdenum, tungsten, rhodium, palladium, platinum, silver, gold, cadmium, aluminum, tin, antimony, bismuth and tellurium. In catalytic reactions, the slurry may contain conventional support materials or precursors of support materials such as alumina-silica, chromia, titania zirconia, Alundum or magnesia. These support materials may be impregnated with active catalytic constituents which have been dried and calcined following conventional techniques. Alternatively, the active catalytic components or their precursors may be incorporated in the slurry used to prepare the amphora II particles. Especially desirable results are achieved when the active catalytic phase of the catalyst contains at least nickel and molybdenum. Especially preferred are support materials containing high surface area alumina and active ingredients containing elements of Group VIB and/or Group VIII of the Periodic Table. For the preferred alumina supported catalysts, a slurry is prepared from the alumina and the slurry is used in the procedure described above. Satisfactory bed materials for the above slurries include finely ground active carbon, graphite, finely divided alumina, powdered Teflon, fluorocarbon powder or mixtures of these materials.

In the hydrotreating of heavy petroleum fractions, the increased catalytic activities exhibited by the use of amphora II catalysts (1) produces a product with lower levels of sulfur and nitrogen compared with use of conventional catalysts, (2) produces a high yield of desired product as a result of increased throughput and (3) produces a product obtained using moderate process conditions, thus enhancing the catalyst life. The hydrotreating process in which the amphora II catalyst is employed is well known. Such reactions are employed primarily in the refining of crude oil or its fractions into products. In hydrotreating reactions of the invention, the hydrocarbon feed is contacted with hydrogen at an elevated temperature and pressure in the presence of the amphora II catalyst. In the hydrotreating process carbon-sulfur bonds, carbon-nitrogen bonds and/or carbon-oxygen bonds are broken in such a manner that the sulfur, nitrogen or oxygen is removed from the hydrocarbon in the form of $H_2S.NH_3$ and $H_2O$. Although the primary use of the hydrotreating is with crude oil or its fraction, hydrotreating can also be used on liquid products derived from coal, tar sands or oil shale.

The hydrotreating reaction of the invention is suitably carried out at a temperature of about 200° to about 600° C., with temperatures of about 300°–425° C. being preferred. The hydrotreating reaction can be carried out in the vapor phase or liquid phase at atmospheric or preferably superatmospheric pressure. The reactant feed contains the hydrocarbon and hydrogen in essentially any ratio desired. Hydrotreating is normally conducted in a fixed-bed reactor using superatmospheric pressure in the range of 100–10,000 p.s.i.g., preferably 200–3,000 p.s.i.g.

Excellent results are achieved when the catalyst contacting the hydrocarbon feed stock comprises at least 20% by weight of said amphora II catalyst, however superior results are achieved when the catalyst employed comprises at least 50% by weight of said amphora II catalyst. Especially desirable results, however, are achieved when substantially all of the catalyst employed comprises said amphora II catalyst.

Because of their spherical shape, amphora catalysts can be readily packed into a fixed-bed reactor without problems of bridging. Further, during operation, the amphora II provides a low pressure drop and a high external surface to catalyst volume ratio. In addition, the high external surface should provide extended catalyst life for those reactions involving surface deactivation of the catalyst through coking or metal deposition.

DESCRIPTION OF THE DRAWING

FIG. A shows a half-section view of the typical amphora II catalyst particle which is an aggregate having a void center and two cavities 180° apart in the enternal surface communicating to the common void center. These amphora II particles can be manufactured by the process of the present invention and vary widely in shape and size according to the process employed and have an external diameter of 1/16" to ¼".

FIG. B shows experimental results of hydrotreating a light Iranian vacuum gas oil to remove sulfur and nitrogen. See the specific embodiments described below.

SPECIFIC EMBODIMENTS

Comparative Examples A to P and Examples 1 to 8: Hydrotreating a Vacuum Gas Oil for Both Sulfur and Nitrogen Removal

Example 1 and Comparative Examples A and B

An "amphora" catalyst support, an extrudate catalyst support of gamma alumina, and an amphora II catalyst support were impregnated to obtain catalysts having 3 weight percent NiO and 15 weight percent $MoO_3$. These catalysts were compared in hydrotreating of vacuum gas oil that was obtained from a crude blend of light Iranian crude oil. The vacuum gas oil had a boiling point of 212.8° C. to 579.4° C. and contained 1.42 weight percent sulfur and 1100 p.p.m. of nitrogen.

Comparative Example A

Amphora Preparation

A ¼" diameter amphora catalyst was prepared as follows: 100 g. of Harshaw ® U-10199-82 alumina hydrate (less than 325 mesh) and 100 g. of Philadelphia Quartz ® A-30 Q-Loid alumina sol (30 weight percent $Al_2O_3$) were slurried with 8 mls. of distilled water. The resulting slurry was dispersed in the form of droplets from a syringe equipped with a 22 gauge needle onto a loose bed of fluorinated graphite supplied by Air Products & Chemicals, Inc. and the droplets were dried by heating with an overhead heat lamp until hard amphora particles were formed. After drying, the amphora was calcined at 427° C. for 2 hours, washed with distilled water to remove adhering graphite and re-dried at 100° C. before a final calcination at 427° C. for an additional 2 hours. A 50 g. sample of the cool, dry amphora particles was impregnated with 25 mls. of an ammoniacal solution containing 7.0 g. of $Ni(NO_3)_2.6H_2O$ and 11.1 g. of $(NH_4)_2Mo_7O_{24}.4H_2O$, dried, and calcined at 427° C. for 2 hours.

Comparative Example B

Extrudate Preparation

A 1/16" diameter extrudate catalyst was prepared from a slurry identical to that used in the amphora preparation. Water was evaporated from the slurry by heating until a consistency suitable for extrusion was reached. The resulting phase was extruded from a 50 cc "Plastipak" syringe onto clean enamel pans. The extrudate was dried at 110° C. for 16 hours, and calcined at 427° C. for 2 hours. A 65 g. sample of the cooled extrudate was impregnated with 33 mls. of an ammoniacal solution containing 9.1 g. of $Ni(NO_3)_2.6H_2O$ and 14.4 g. of $(NH_4)_2Mo_7O_{24}.4H_2O$, dried and calcined at 427° C. for 2 hours.

Example 1

Amphora II Preparation

A ¼" diameter amphora II catalyst of the invention was prepared as follows: 100 g. of Harshaw ® U-10199-82 alumina hydrate (less than 325 mesh) and 100 g. of Philadelphia Quartz ® A-30 Q-Loid alumina sol (30 weight percent $Al_2O_3$) were slurried. The resulting slurry was dispensed in the form of droplets from a syringe equipped with a 22 guage needle onto a loose bed of fluorinated graphite supplied by Air Products & Chemicals, Inc. and frozen with liquid nitrogen. The bed material containing the frozen spheres was then heated from above with a heat lamp, dried, and calcined at 427° C. for 65 hours. The amphora II particles were impregnated with 35 mls. of an ammoniacal solution of 8.8 g. of $Ni(NO_3)_2.6H_2O$ and 13.9 g. of $(NH_4)_2Mo_7O_{24}.4H_2O$, dried and calcined at 427° C. for 2 hours.

Comparative Examples C to P and Examples 2 to 8

A portion of the catalyst particles prepared in Example 1 and Comparative Examples A and B were charged to a 50 cc., 1 inch diameter fixed-bed reactor and presulfided at 371° C. and ambient pressure with a mixture of 95% $H_2$/5% $H_2S$ for 4 hours prior to introduction of the feed. The vacuum gas oil feed stock was hydrotreated over a range of temperatures from 316° C. to 399° C. using 500 p.s.i.g. total pressure and a hydrogen:feed ratio of 3500 standard cubic feed of hydrogen per barrel of feed. The results of comparative examples C to P and examples 2-8 are shown in the Table below.

It is readily apparent from the data presented above that unexpectedly improved results are appreciated using the amphora II catalyst of the invention compared with use of "amphora" or the extrudate over the full range of process conditions. Said improvement is attibuted to use of amphora II having a specific particle shape.

FIG. B shows that the activity of the amphora catalyst falls below that of the extrudate at temperatures higher than 343° C., with respect to sulfur and nitrogen conversion. At these higher temperatures, the rates of hydrotreating reactions are higher and the turnover rate of the liquid pool in the amphora is not fast enough to compensate for the higher rates of reaction. The amphora II catalyst performs better than the amphora or the extrudate over the entire range of process conditions, which indicates the improvement realized using the amphora II catalyst under these process conditions. Even at the higher linear velocities where the regular amphora catalyst outperforms the extrudate, amphora II exhibits a higher level of activity than the amphora, indicating that the improved flow and increased external surface area available to the moving film leads to higher conversions.

TABLE

Hydrotreating to Remove Sulfur and Nitrogen from Vacuum Gas Oil

| Example | Catalyst | Temp. °C. | LHSV(hr.$^{-1}$) | Product S (wt. %) | % S Removal | Product N (ppm) | % N Removal |
|---|---|---|---|---|---|---|---|
| Comp. C | 1/8" Amphora I | 371 | 1.0 | 0.43 | 69.7 | 814 | 25.9 |
| Comp. D | " | 371 | 2.0 | 0.57 | 59.9 | 840 | 23.6 |
| Comp. E | " | 371 | 3.0 | 0.65 | 54.2 | 907 | 17.5 |
| Comp. F | " | 371 | 4.0 | 0.74 | 47.9 | 862 | 21.6 |
| Comp. G | " | 343 | 2.0 | 0.76 | 46.5 | 889 | 19.2 |
| Comp. H | " | 316 | 2.0 | 1.04 | 26.8 | 927 | 15.7 |
| Comp. I | " | 399 | 2.0 | 0.44 | 69.0 | 858 | 22.0 |
| Comp. J | 1/16" extrudate | 371 | 1.0 | 0.37 | 73.9 | 788 | 28.4 |
| Comp. K | " | 371 | 2.0 | 0.54 | 62.0 | 835 | 24.1 |
| Comp. L | " | 371 | 3.0 | 0.68 | 52.1 | 878 | 20.2 |
| Comp. M | " | 371 | 4.0 | 0.76 | 46.5 | 891 | 19.0 |
| Comp. N | " | 399 | 2.0 | 0.40 | 71.8 | 797 | 27.5 |
| Comp. O | " | 343 | 2.0 | 0.81 | 43.0 | 933 | 15.2 |
| Comp. P | " | 316 | 2.0 | 1.09 | 23.2 | 934 | 15.1 |
| 2 | 1/8" Amphora II | 371 | 1.0 | 0.33 | 76.8 | 744 | 32.3 |
| 3 | " | 371 | 2.0 | 0.52 | 63.4 | 809 | 26.4 |
| 4 | " | 371 | 3.0 | 0.64 | 54.9 | 894 | 18.7 |
| 5 | " | 371 | 4.0 | 0.70 | 50.7 | 885 | 19.5 |
| 6 | " | 316 | 2.0 | 1.04 | 26.8 | 880 | 19.9 |
| 7 | " | 343 | 2.0 | 0.84 | 40.8 | 832 | 24.3 |
| 8 | " | 399 | 2.0 | 0.35 | 75.4 | 754 | 31.4 |

We claim:

1. Aggregates having a substantially spherical shape, a void center therein, a first cavity in the external surface communicating with the said void center, a second cavity 180° from said first cavity communicating with said void center prepared by:
   (a) preparing a slurry, the slurry comprising a suspending liquid and distinct particles of a first solid suspended in said liquid;
   (b) preparing a particle bed consisting of particles of a second solid;
   (c) forming droplets of the slurry;
   (d) dropping the droplets of the slurry onto said particle bed in such a manner that the droplets are not immersed in the particle bed;
   (e) freezing said droplets on said particle bed to enhance the rate of drying on the external surface of the slurry droplets and to retard the rate of drying in the interior of the slurry droplets; and
   (f) removing at least part of said suspending liquid from said frozen droplets in said particle bed to form said amphora catalyst.

2. The aggregate of claim 1 containing at least one element selected from the group consisting of vanadium, chromium, manganese, iron, cobalt, nickel, copper, zinc, molybdenum, tungsten, rhodium, palladium, platinum, silver, gold, cadmium, aluminum, tin, antimony, bismuth and tellurium.

3. The aggregate of claim 1 having an external diameter of 1/16 inch to ½ inch.

4. A process for preparing aggregates comprising:
   (a) preparing a slurry, the slurry comprising a suspending liquid and distinct particles of the first solid suspended in said liquid;
   (b) preparing a particle bed consisting of particles of a second solid;
   (c) forming droplets of the slurry;
   (d) dropping the droplets of the slurry onto said particle bed in such a manner that the droplets are not immersed in the particle bed;
   (e) freezing said droplets on said particle bed to enhance the rate of drying on the external surface of the slurry droplets and to retard the rate of drying in the interior of the slurry droplets; and
   (f) removing at least part of said suspending liquid from said frozen droplets in said particle bed to form said amphora catalyst.

5. The process of claim 4 wherein said suspending liquid is water.

6. The process of claim 4 wherein the rate of drying in the interior of the slurry droplets is retarded by freezing the slurry droplets.

7. The process of claim 6 wherein said freezing is accomplished by the use of liquid nitrogen.

8. The process of claim 4 where the first solid is a catalyst or catalyst precursor.

9. The process of claim 4 wherein the first solid contains at least nickel and molybdenum.

10. The process of claim 4 wherein the particle size of the first solid is less than about 1 millimeter.

11. The process of claim 4 wherein the particle bed is composed of particles having a size below about 500 microns.

12. The process of claim 4 wherein the first solid and the second solid are chemically similar.

13. Aggregates having a substantially spherical shape, a void center therein, a first cavity and the external surface communicating with the void center, a second cavity 180° from said first cavity communicating with said void center prepared by:
   (a) preparing a slurry, the slurry comprising a suspending liquid, said suspending liquid consisting of a mixture of water and a liquid of similar polarity having a higher boiling point than water, and distinct particles of a first solid suspended in said liquid;

(b) preparing a particle bed consisting of particles of second solid;

(c) forming droplets of the slurry;

(d) dropping the droplets of the slurry onto said particle bed in such a manner that the droplets are not immersed in the particle bed;

(e) freezing said droplets on said particle bed to enhance the rate of drying on the external surface of the slurry droplets and to retard the rate of drying in the interior of the slurry droplets; and (f) removing at least part of said suspending liquid from said frozen droplets in said particle bed to form said amphora catalyst.

14. The aggregate of claim 13 wherein the suspending liquid consists of a mixture of water and an alcohol or a polyalcohol.

15. The aggregate of claim 1 wherein said suspending liquid is water.

16. The aggregate of claim 1 wherein the first solid is a catalyst or catalyst precursor.

17. The aggregate of claim 1 wherein the first solid contains at least nickel and molybdenum.

18. The aggregate of claim 1 wherein the particle size of the first solid is less than about 1 millimeter.

19. The aggregate of claim 1 wherein the particle bed is composed of particles having a size below about 500 microns.

20. The aggregate of claim 1 wherein the first solid and the second solid are chemically similar.

* * * * *